US011125602B2

(12) United States Patent
Kuhnen et al.

(10) Patent No.: US 11,125,602 B2
(45) Date of Patent: Sep. 21, 2021

(54) ELECTROMAGNETIC DRIVING/RECEIVING UNIT FOR A FIELD DEVICE OF AUTOMATION TECHNOLOGY

(71) Applicant: Endress+Hauser SE+Co. KG, Maulburg (DE)

(72) Inventors: Raphael Kuhnen, Schliengen (DE); Ira Henkel, Wehr (DE); Dietmar Frühauf, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 230 days.

(21) Appl. No.: 16/315,280

(22) PCT Filed: Jun. 26, 2017

(86) PCT No.: PCT/EP2017/065629
§ 371 (c)(1),
(2) Date: Jan. 4, 2019

(87) PCT Pub. No.: WO2018/007177
PCT Pub. Date: Jan. 11, 2018

(65) Prior Publication Data
US 2019/0226901 A1    Jul. 25, 2019

(30) Foreign Application Priority Data

Jul. 5, 2016  (DE) ...................... 10 2016 112 308.0

(51) Int. Cl.
*G01N 9/00*     (2006.01)
*G01F 23/296*   (2006.01)
(Continued)

(52) U.S. Cl.
CPC ............ *G01F 23/2968* (2013.01); *G01F 1/05* (2013.01); *G01F 23/2966* (2013.01);
(Continued)

(58) Field of Classification Search
CPC .... G01F 23/2968; G01F 23/2966; G01F 1/05; G01F 1/8459; G01F 1/8468; G01N 9/002; G01N 11/16; G01N 2009/006
(Continued)

(56) References Cited

U.S. PATENT DOCUMENTS 10,557,744 B2 * 2/2020 Kuhnen .............. G01F 23/2966

FOREIGN PATENT DOCUMENTS

CN    101377426 A    3/2009
CN    1675523 A      4/2009
(Continued)

OTHER PUBLICATIONS

Search Report for German Patent Application No. 10 2016 112 308.0, German Patent Office, dated Sep. 5, 2017, 6 pp.
International Search Report for Patent Application No. PCT/EP2017/065629, WIPO, dated Oct. 5, 2017, 13 pp.

*Primary Examiner* — Robert R Raevis
(74) *Attorney, Agent, or Firm* — Christopher R. Powers; Endress+Hauser (USA) Holding Inc.

(57) ABSTRACT

The present disclosure includes an electromechanical transducer unit for a field device of automation technology including a membrane having a base area and displaceable to execute mechanical oscillations, three rods secured to the membrane perpendicular to the base area, a housing, wherein the rods extend into the housing, three magnets, each secured to one of the rods opposite the membrane, and a coil having a core and secured within the housing adjacent the magnets, the coil embodied to produce a magnetic field that causes the rods to execute mechanical oscillations. The rods are secured to the membrane such that oscillations of the membrane result from the oscillations of the rods. At least one of the rods is secured to the base area where the (Continued)

second derivative of the deflection of the membrane from a rest position as a function of the site on the base area is essentially zero.

13 Claims, 5 Drawing Sheets

(51) Int. Cl.
    *G01N 11/16*      (2006.01)
    *G01F 1/05*      (2006.01)

(52) U.S. Cl.
    CPC ............. *G01N 9/002* (2013.01); *G01N 11/16* (2013.01); *G01N 2009/006* (2013.01)

(58) Field of Classification Search
    USPC ............ 73/32 A, 19.03, 24.01, 24.05, 24.06, 73/54.01, 54.24–54.27, 54.41, 61.45, 579, 73/290 V
    See application file for complete search history.

(56) References Cited

FOREIGN PATENT DOCUMENTS

| | | |
|---|---|---|
| CN | 104142167 A | 11/2014 |
| DE | 1773815 A1 | 7/1968 |
| DE | 1773815 A1 | 2/1972 |
| DE | 102005015547 A1 | 10/2006 |
| DE | 102006034105 A1 | 1/2008 |
| DE | 102007013557 A1 | 2/2008 |
| DE | 102009026685 A1 | 12/2010 |
| DE | 102009028022 A1 | 2/2011 |
| DE | 102010030982 A1 | 1/2012 |
| DE | 102015104533 A1 | 9/2016 |
| DE | 102015104536 A1 | 9/2016 |
| EP | 0949489 A1 | 10/1999 |
| GB | 1250537 A | 10/1971 |
| GB | 2185575 A | 7/1987 |
| TW | 370613 B | 9/1999 |
| WO | 2007113011 A1 | 4/2007 |
| WO | 2007113011 A1 | 10/2007 |
| WO | 2015028179 A1 | 7/2014 |
| WO | 2015028179 A1 | 3/2015 |

\* cited by examiner

Fig. 1a

PRIOR ART

Fig. 1b

PRIOR ART

ELECTROMAGNETIC DRIVING/RECEIVING UNIT FOR A FIELD DEVICE OF AUTOMATION TECHNOLOGY

CROSS-REFERENCE TO RELATED APPLICATIONS

The present application is related to and claims the priority benefit of German Patent Application No. 10 2016 112 308.0, filed on Jul. 5, 2016 and International Patent Application No. PCT/EP2017/065629, filed on Jun. 26, 2017 the entire contents of which are incorporated herein by reference.

TECHNICAL FIELD

The invention relates to an electromechanical transducer unit for a field device of automation technology and to an apparatus for determining and/or monitoring at least one process variable of a medium in a containment and having an electromechanical transducer unit of the invention. The process variable is, for example, the fill level or the flow velocity of the medium or even its density or viscosity. The medium is located, for example, in a container, a tank, or even in a pipeline.

BACKGROUND

In automation technology, the most varied of field devices are applied for determining and/or monitoring at least one process variable, especially a physical or chemical, process variable. Involved, for example, are fill-level measuring devices, flow measuring devices, pressure and temperature measuring devices, pH-redox potential measuring devices, conductivity measuring devices, etc., which register the corresponding process variables, fill level, flow, pressure, temperature, pH-value, and conductivity, etc. The associated measuring principles are known from a large number of publications.

A field device typically includes at least one sensor unit coming at least partially and at least at times in contact with the process, and an electronics unit, which serves, for example, for signal registration, evaluation and/or feeding. Referred to as field devices in the case of the present invention are, in principle, all measuring devices, which are applied near to the process and which deliver, or process, process relevant information, thus, also remote I/Os, radio adapters, and, generally, electronic components, which are arranged at the field level. A large number of such field devices are manufactured and sold by the Applicant.

In a number of corresponding field devices, electromechanical transducer units are used. An example of this are vibronic sensors, such as, for example, vibronic fill level or flow measuring devices. They are also used in ultrasonic fill-level measuring devices or flow measuring devices. To visit each type of field device, for which an electromechanical transducer unit of the invention is applicable, separately and in detail would be superfluous. Thus, for purposes of simplicity, while reference is made to particular field devices, the following description is limited, by way of example, to fill-level measuring devices with an oscillatable unit. Corresponding field devices are sold by the Applicant, for example, under the marks, LIQUIPHANT and SOLIPHANT. The basic underlying measuring principles are known.

The oscillatable unit of such a fill-level measuring device, also referred to as a vibronic sensor, is, for example, an oscillatory fork, a single rod or a membrane. During operation, such an oscillatable unit is excited by a driving/receiving unit, usually in the form of an electromechanical transducer unit, for example, in the form of a piezoelectric, electromagnetic or even magnetostrictive driving/receiving unit, by means of an electrical exciting signal to execute mechanical oscillations. Conversely, the driving/receiving unit can receive the mechanical oscillations of the mechanically oscillatable unit and convert them into an electrical, received signal. The driving/receiving unit can be either a separate driving unit and a separate receiving unit, or a combined driving/receiving unit.

For exciting the mechanically oscillatable unit, the most varied of methods, both analog as well as also digital, have been developed. In many cases, the driving/receiving unit is part of a feedback electrical, oscillatory circuit, by means of which the exciting of the mechanically oscillatable unit to execute mechanical oscillations occurs. For example, for a resonant oscillation, the oscillatory circuit condition, according to which the amplification factor is greater than or equal to 1 as well as all phases arising in the oscillatory circuit must sum to a multiple of 360°, must be fulfilled. This has the result that a certain phase shift between the exciter signal and the received signal must be assured. For this, the most varied of solutions are known. In principle, the setting of the phase shift can be performed, for example, by application of a suitable filter, or even be controlled by means of a control loop to a predeterminable phase shift, the desired value. Known from DE102006034105A1, for example, is to use a tunable phase shifter. The additional integration of an amplifier with a tunable amplification factor for additional control of the oscillation amplitude was described, in contrast, in DE102007013557A1. DE102005015547A1 provides the application of an all-pass filter. The setting of the phase shift is, moreover, possible by means of a method involving frequency sweep, such as disclosed, for example, in DE102009026685A1, DE102009028022A1, and DE102010030982A1. The phase shift can, however, also be controlled by means of a phase control loop (phase-locked-loop, PLL) to a predeterminable value. Such an excitation method is subject matter of DE102010030982A1.

Both the exciter signal as well as also the received signal are characterized by frequency, amplitude and/or phase. Changes in these variables are then usually taken into consideration for determining the particular process variable, such as, for example, a predetermined fill level of a medium in a container, or even the density and/or viscosity of a medium. In the case of a vibronic limit level switch for liquids, for example, of interest is whether the oscillatable unit is covered by the liquid or freely oscillating. These two states, the free state and the covered state, are, in such case, recognized, for example, based on different resonance frequencies, thus, a frequency shift, or based on damping of the oscillation amplitude.

The density and/or viscosity can, in turn, only be ascertained with such a measuring device, when the oscillatable unit is covered by the medium. Known from DE10050299A1, DE102006033819A1 and DE102007043811A1 is to determine the viscosity of a medium based on the frequency-phase curve ($\phi=g(f)$). This procedure is based on the dependence of the damping of the oscillatable unit by the viscosity of the medium. To eliminate the influence of the density on the measuring, the viscosity is determined based on a frequency change caused by two different values for the phase, thus, by means by a relative measurement. For determining and/or monitoring the density of a medium, in contrast, according to DE10057974A1, the influence of at least one disturbing variable, for example, the viscosity, on the oscillation frequency of the mechanically oscillatable unit is ascertained and compensated. In DE102006033819A1, it is, furthermore, taught to set a predeterminable phase shift between the exciter signal and the received signal, in the case of which effects of changes of the viscosity of the medium on the mechanical oscillations of the mechanically oscillatable unit are negligible. At this phase shift, an empirical formula for determining the density can be created.

The driving/receiving unit is, as already mentioned, as a rule, embodied as an electromechanical transducer unit. Often, it includes at least one piezoelectric element in the most varied of embodiments. By using the piezoelectric effect, a comparatively high efficiency of changing the electrical into mechanical energy can be achieved. Corresponding piezoceramic materials based on LZT (lead zirconium titanate) are, normally, suitable for use at temperatures up to 300° C. There are piezoceramic materials, which keep their piezoelectric properties at temperatures above 300° C.; these have, however, the disadvantage that they are significantly less effective than the materials based on LZT. Added to this are significant differences between the coefficients of thermal expansion of metals and ceramic materials, a feature which can be especially disadvantageous at high temperatures.

Due to their function as force providers, a force transmitting connection of the piezoelectric element with a membrane of the sensor, which is at least one part of the oscillatable unit, must always be assured. Especially in the case of high temperatures, however, large mechanical stresses arise, which can lead to of a breaking the piezoelectric element and, associated therewith, a total failure of the sensor.

An alternative, which can be better suited for use at high temperatures, are so-called electromagnetic driving/receiving units, such as, for example, described in the documents, WO 2007/113011 and WO 2007/114950 A1. The changing of electrical energy into mechanical energy occurs, in such case, via a magnetic field. A corresponding electromechanical transducer unit includes at least one coil and a permanent magnet. By means of the coil, an alternating magnetic field passing through the magnet is produced, and, via the magnet, a periodic force is transferred to the oscillatable unit. Usually, the transfer of this periodic force occurs similarly to the principle of the solenoid, which sits centrally on the membrane.

Since in the case of an electromagnetic driving/receiving unit no force transmitting connection with the membrane of the oscillatable unit is necessary, such can be used, in comparison with piezoelectric transducer units, in an expanded temperature range, especially between −200° C. and 500° C. However, because of the absence of a force transmitting connection, usually the efficiency is significantly lower than in the case of piezoelectric driving/receiving units. While an electromagnetic driving/receiving unit can develop relatively high forces in the region of the membrane, the deflection of the oscillatory fork as a result of the non-force transmitting connection between membrane and drive is comparatively small. As a result, more energy is required for an electromagnetic driving/receiving unit in comparison with a piezoelectric driving/receiving unit, which makes use of a corresponding sensor in explosion endangered regions problematic.

An electromechanical transducer unit with an increased efficiency is described in the as yet unpublished German patent application No. 102015104533.8 (US2018074018), which is incorporated here by reference.

SUMMARY

Starting from the state of the art, it is an object of the present invention to provide an electromagnetic driving/receiving unit, i.e. an electromechanical transducer unit, having at least one coil and a magnet, which is distinguished by an increased efficiency compared to the state of the art.

This object of the invention is achieved by an electromechanical transducer unit for a field device of automation technology, comprising:
    a membrane displaceable to execute mechanical oscillations,
    at least three rods secured to the membrane perpendicularly to a base area of the membrane,
    a housing, wherein the membrane forms at least a portion of a wall of the housing, and wherein the rods extend into the housing interior,
    at least three magnets, wherein, in each case, one of the magnets is secured to each of the at least three rods in an end region away from the membrane, and
    a coil having a core and secured within the housing above the magnets, wherein the coil is suppliable with an electrical alternating current signal,
wherein the coil is embodied to produce a magnetic field, which magnetic field causes the rods by means of the magnets to execute mechanical oscillations,
wherein the rods are secured to the membrane in such a manner that oscillations of the membrane result from the oscillations of the rods, and wherein at least one of the rods is secured to the membrane essentially at a site on the base area of the membrane, where the second derivative of the deflection of the membrane from a rest position as a function of the site on the base area of the membrane is essentially zero.

The changing of electrical into mechanical energy occurs via a magnetic, alternating field, which is produced by means of the coil with core. A magnetic field present at a fixed, selectable point in time in the region of the rods effects, in each case, a deflection in the membrane far region of the rods unilaterally secured to the membrane, in the region where the magnets are secured on the rods. Because of the magnetic, alternating field, the rods are, thus, caused to oscillate, wherein the oscillatory movement of the rods occurs transversely, i.e. perpendicularly, to their longitudinal axes. The rods behave correspondingly, virtually as dedicated mechanical resonators. Because of the connection, especially force transmitting connection, of the rods with the membrane, the oscillatory movement of the rods is also transferred to the membrane, which, thus, likewise executes an oscillatory movement.

According to the invention, at least one of the rods is essentially secured to the membrane at a site on the base area of the membrane, where the second derivative of the deflection of the membrane from a rest position as a function of the site on the base area is essentially zero. Where on the base area of the membrane the second derivative of the deflection of the membrane from a rest position is essentially zero depends, among other things, on the oscillatory mode of the membrane.

At least one of the rods is, thus, essentially secured in the region of a point of inflection of the deflection from the rest position as a function of the location on the membrane. In such case, involved is the region, which at the time of a maximum oscillation amplitude of the membrane relative to a plane parallel with the base area of the membrane, thus, relative to the rest position, is the most curved. The rest position of the membrane is, in such case, that position, in which no resulting force acts on the membrane, in which the membrane is, thus, not curved, but, instead, essentially planar.

Because of the positioning of the rods of the invention, an especially efficient transfer of the oscillatory movements of the rods to the membrane is achieved. The energy required for operating the transducer unit of the invention is correspondingly advantageously minimized in comparison with equivalent electromechanical transducer units, in the case of which the rods are secured in other regions on the base area of the membrane.

The electromechanical transducer unit of the invention is, furthermore, best suited for use in an expanded temperature range, especially for use at high temperatures. The maximum allowable temperature is dependent, for example, on the material selected for the magnets. Since the rods are connected in an end region directly with the membrane and form a dedicated mechanical resonator, the efficiency of an electromechanical transducer unit of the invention is significantly increased, compared with the above described variants for electromagnetic driving/receiving units based on the principle of a solenoid from the state of the art. In spite of this, the structural construction of an electromechanical transducer unit of the invention is comparatively simple.

The magnets are, for example, so-called Alnico magnets. Alnico magnets are occasionally also referred to as steel magnets. Of concern are alloys of iron, aluminum, nickel, copper and cobalt, from which permanent magnets are manufactured by casting technologies or by means of sinter processes. Among other features, such magnets are distinguished by a high remnant flux density (about 0.6-1.3 T) as well as by a high Curie temperature of 700-850° C., which permits applications in a temperature range at least up to 500° C. An interesting alternative is provided, in given cases, by so-called rare earth magnets, which are essentially composed of iron metals and rare earth metals. An example is samarium-cobalt magnets, which are referred to hereinafter as SmCo magnets, which presently can be used at temperatures up to 350°; and research efforts are aiming for operating temperatures of greater than 500° C. Of course, other magnets likewise falling within the scope of the present invention can be used for the present invention. The magnets are embodied, for example, rod-shaped. Preferably, the shape of the magnets in an embodiment of the invention is, however, also matched to the shape of the coil with core, especially in such a manner that, in each case, a surface of the magnets facing the coil with core is as large as possible and the separation between the respective magnet and the coil with core is as small as possible.

In a preferred embodiment of the transducer unit of the invention, at least one of the rods is secured to the membrane essentially on a circular line extending around the midpoint of the base area of the membrane. This choice is especially advantageous for oscillations of the membrane in the fundamental oscillation mode, in the case of which the midpoint of the membrane experiences the greatest deflection. However, this embodiment is suitable also for higher oscillation modes, in the case of which the midpoint of the membrane experiences the greatest deflection. For higher oscillation modes, in such case, lines of nodes occur increasingly on the base area of the membrane.

An embodiment of the invention provides that the number the rods is an even number, wherein the rods are arranged symmetrically along the circular line around the midpoint of the membrane.

Alternatively, the number the rods is an odd number, wherein the rods are arranged at equal angles along the circular line around the midpoint of the membrane.

Advantageously, the coil with core is arranged essentially above the midpoint of the base area of the membrane.

For example, the core of the coil can be part of a pot-shaped armature unit, which has a floor and a peripheral wall, wherein starting from the floor and extending centrally into the interior of the armature unit a nozzle is secured, wherein the nozzle forms the core of the coil, and wherein the peripheral wall serves as magnetic field guide back. The peripheral wall extends, for example, until it reaches the vicinity of the rods, which the armature unit should, however, not contact. This embodiment offers, on the one hand, structural advantages, since both the coil core as well as also a field guide back can be provided as a single piece in the form of the armature unit. The field guide back cares, in such case, however, furthermore, also for a magnetic shielding, which provides an increased disturbance resistance. The armature unit is preferably manufactured of a material with high magnetic permeability, especially iron, cobalt, or cobalt iron, or is composed of a metal glass. In reference to a high magnetic permeability, especially suited are ferromagnetic materials having at least $\mu > 100$. For example, the permeability $\mu$ of cobalt iron lies in the range $\mu_{cobalt\ iron} \approx 10000\text{-}150000$, that of cobalt in the range $\mu_{cobalt} \approx 100\text{-}200$ and for iron $\mu_{iron} \approx 300\text{-}10000$. Especially advantageous is when the material for the armature unit has an as low as possible hysteresis. The hysteresis should at least be so small that the material can follow a steady reverse magnetizing corresponding to the frequency of the exciting signal.

Ferromagnetic materials are especially well suited for use at high temperatures. If the requirement of usability at especially high temperatures is, in contrast, not the central focus, then metal glasses, whose magnetic permeability lies typically in the range $\mu_{metglas} \approx 1500\text{-}4000$, can be considered, since these have especially low hysteresis and, associated therewith, low losses in the reverse magnetizing.

A preferred embodiment provides that each of the magnets has essentially the same separation from the coil with core. In such case, it is advantageous that the separation between each of the magnets and the coil with core is less than 2 mm. These data relate to a point in time, when exactly no magnetic field is present. In this way, all rods can be caused to execute mechanical oscillations in the same manner, when the separation between each of the rods, especially the magnets secured terminally on the rods, and the coil with core are essentially equal.

For a best possible efficiency of energy transfer from the coil with core to the rods, this separation should be as small as possible. In such case, however, the magnets must not contact the coil with core.

When the core of the coil is embodied as part of a pot-shaped armature unit, the magnets extend, for example, contactlessly into the pot-shaped armature unit, so that, when no magnetic field is present, they are located at the same separation from the coil. In this way, the two magnets are completely encased by the magnetic field guide back.

The object of the invention is achieved, furthermore, by an apparatus for determining and/or monitoring at least one process variable of a medium in a containment, comprising
 a sensor unit having at least one electromechanical transducer unit of the invention, and
 an electronics unit, wherein the electromechanical transducer unit is embodied to excite the sensor unit by means of an electrical exciting signal in the form of an electrical alternating current signal, with which the coil is supplied, to execute mechanical oscillations, and to receive the mechanical oscillations of the sensor unit and to convert such into an electrical, received signal in the form of an electrical alternating current signal, and wherein the electronics unit is embodied to produce the exciter signal starting from the received signal, and to determine the at least one process variable at least based on the received signal. The electromechanical transducer unit of the invention is, thus, in principle, a driving/receiving unit of the apparatus of the invention, or at least a part thereof. The electromechanical transducer unit can also be applied in the form of a virtually separate driving unit or receiving unit.

The sensor unit includes, furthermore, preferably an, especially mechanically, oscillatable unit. In this case, the apparatus of the invention is a vibronic sensor.

Advantageously, the length L of the two rods is selected in such a manner that $L=n\lambda/2+\lambda/4$, wherein $\lambda$ is the wavelength of the waves propagating along the rods and n is a natural number. The length of the rods is, thus, selected corresponding to a desired excitation frequency of the exciting signal and corresponding to their oscillation characteristics. Furthermore, by adjusting the length of the rods and, moreover, by the embodiment of a housing of the apparatus, a temperature decoupling is achievable, which results from the spatial separation, especially of the magnets and coil with core, from the process. The apparatus of the invention can, thus be matched, with targeting, to the particular process requirements. This is performed, on the one hand, by choosing the length of the rods. Moreover, however, also the housing can be manufactured of a material, which is distinguished by a good thermal insulation, so that it serves supplementally the function of a temperature spacing tube. A greater separation from the membrane, thus, a spatial separation of the magnets and coil from the membrane, effects a temperature decoupling. In this way, the allowable temperature range can be expanded further above that defined by the magnets. Here, it is, however, to be noted that, with increasing length of the rods, the efficiency of the force transfer slightly decreases. Thus, there must always be a balancing between the desired allowable temperature interval and the desired efficiency.

An embodiment provides that the oscillatable unit comprises at least a portion of the membrane, or at least a portion of the membrane as well as at least one oscillatory tine secured thereto. The oscillatable unit is, thus, a membrane, a single rod or an oscillatory fork.

The membrane can, on the one hand, be embodied as one piece. In the case, in which the correspondingly embodied apparatus includes an oscillatable unit, the membrane is then, on one side, associated with the electromagnetic transducer unit, while, on the other side, it forms simultaneously at least one part of the oscillatable unit. On the other hand, an embodiment provides that the membrane has two portions connected force-transmittingly with one another, wherein a first portion is associated with the electromagnetic transducer unit and wherein a second portion is associated with the oscillatable unit. The connection between the two portions can be manufactured, for example, by means of a solder, braze, weld or adhesive connection.

The oscillatable unit is arranged, for example, in a defined position within the containment, in such a manner that it reaches to a determinable penetration depth in the medium. In this way, especially the process variables, viscosity and/or density, can be determined.

Advantageously, the process variable is a fill level or the flow velocity of the medium in the containment, or the density or the viscosity of the medium.

In a preferred embodiment of the present invention, the oscillatable unit is an oscillatory fork having two tines, wherein the electromechanical transducer unit comprises four rods, and wherein two of the four rods of the electromechanical transducer unit are secured to the membrane and the two oscillatory tines secured to the membrane are arranged oppositely lying and mirror symmetrically to one another with reference to the plane perpendicular to the longitudinal axis through the rods and/or oscillatory tines. In each case, an oscillatory tine of the oscillatable unit and a rod of the electromechanical transducer unit extend, thus, essentially along the same imaginary line in parallel with their two longitudinal axes. Especially, these two rods and oscillatory tines are arranged in such a manner that they are located at the same distance from the midpoint of the base area of the membrane perpendicularly to the longitudinal axes of the rods and oscillatory tines. This symmetric arrangement in the case of a vibronic sensor with an oscillatory fork as oscillatable unit achieves an especially high efficiency.

The oscillatory tines, transducer rods and the membrane form a coupled oscillatory system, wherein the coupling is determined by the membrane. For the example of an oscillatable unit in the form of an oscillatory fork, for example, the two oscillatory tines and the membrane form a first mechanical resonator, the two rods of the electromechanical transducer unit opposite lying the oscillatory tines form with the membrane a second resonator and the two other rods and the membrane form a third resonator. The frequency of the exciting signal is preferably so selected that the first and second resonators oscillate in an antisymmetric, oscillatory mode with reference to the plane through the membrane perpendicular to the longitudinal axes of the transducer rods and/or oscillatory tines. In the oscillatory system formed, in principle, by three resonators, basically three resonance frequencies occur. This is described in more detail in connection with FIG. 5.

An alternative preferred embodiment of the present invention provides, likewise, that the oscillatable unit is an oscillatory fork having two tines. However, the electromechanical transducer unit comprises three rods, wherein the three rods are arranged in the corner points of an equal angled triangle arranged around the midpoint M of the membrane, in such a manner that the connecting line between two of the three transducer rods extends in parallel with a connecting line between the two oscillatory tines.

Arranging at least one of the transducer rods in a region of the membrane, which during the oscillatory movement experiences an especially large curvature, provides an especially high efficiency for transferring the oscillations from the transducer rods to the membrane and, in given cases, to an oscillatable unit. The efficiency grows, in such case, basically with the number of transducer rods used. However, a maximizing of the number of rods is limited by, among other things, the available space within the housing of the apparatus. It is to be noted here that the frequencies of the oscillatory movements are influenceable especially by adjusting the length and/or stiffness of the rods.

BRIEF DESCRIPTION OF THE DRAWINGS

The invention as well as advantageous embodiments thereof will now be described in greater detail based on the appended drawing, the figures of which show as follows.

DETAILED DESCRIPTION

Figure 1A:
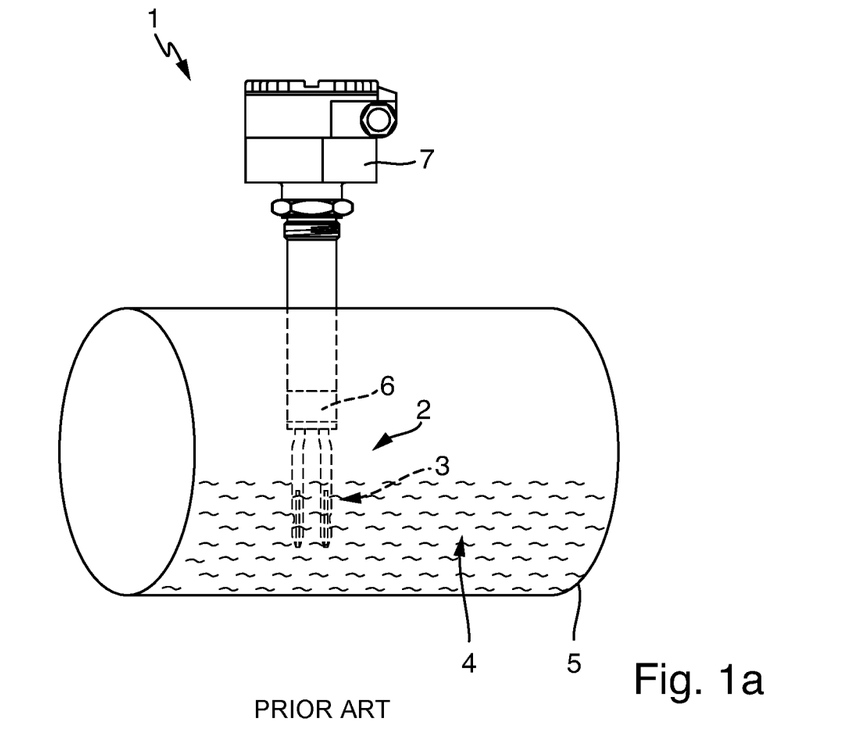
FIG. 1a shows a schematic view of a vibronic sensor of the state of the art.

FIG. 1a shows a vibronic fill-level measuring device 1. A sensor unit 2 with a mechanically oscillatable unit 3 in the form of an oscillatory fork protrudes partially into a medium 4, which is located in a container 5. The oscillatable unit 3 is excited by means of the driving/receiving unit 6, as a rule, an electromechanical transducer unit, to execute mechanical oscillations. The driving/receiving unit 6 can be, for example, a piezoelectric stack or bimorph drive, however, also an electromagnetic or even a magnetostrictive driving/receiving unit. It is understood, however, that also other embodiments of a vibronic fill-level measuring device are possible. Further provided is an electronics unit 7, by means of which signal registration, evaluation and/or—feeding occurs.

Figure 1B:
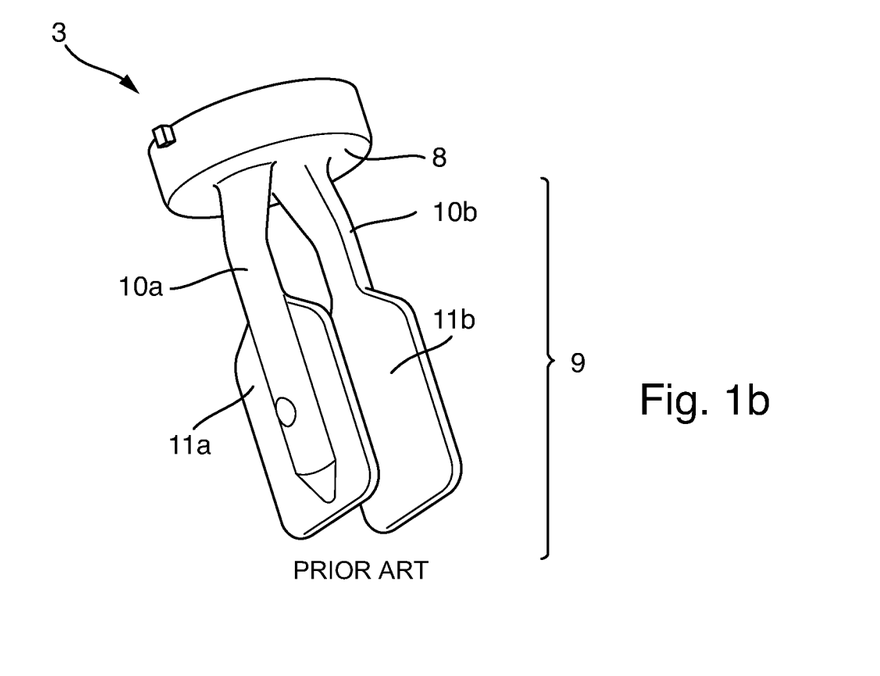
FIG. 1b shows a perspective view of an oscillatory fork of the state of the art.

FIG. 1b provides a more detailed view of an oscillatable unit 3 in the form of an oscillatory fork, such as applied, for example, for the LIQUIPHANT instrument. Shown is a membrane 8 and an oscillatory element 9 connected therewith. The oscillatory element 9 includes two oscillatory tines 10a, 10b having terminal paddles 11a, 11b. In operation, the oscillatory fork 3 executes oscillatory movements corresponding to the oscillatory mode, with which it is excited. Each of the two oscillatory tines 10a, 10b behaves essentially as a so-called bending oscillator. In the fundamental oscillation mode, the two oscillatory tines 10a, 10b oscillate, for example, with opposite phase relative to one another.

Figure 2A:
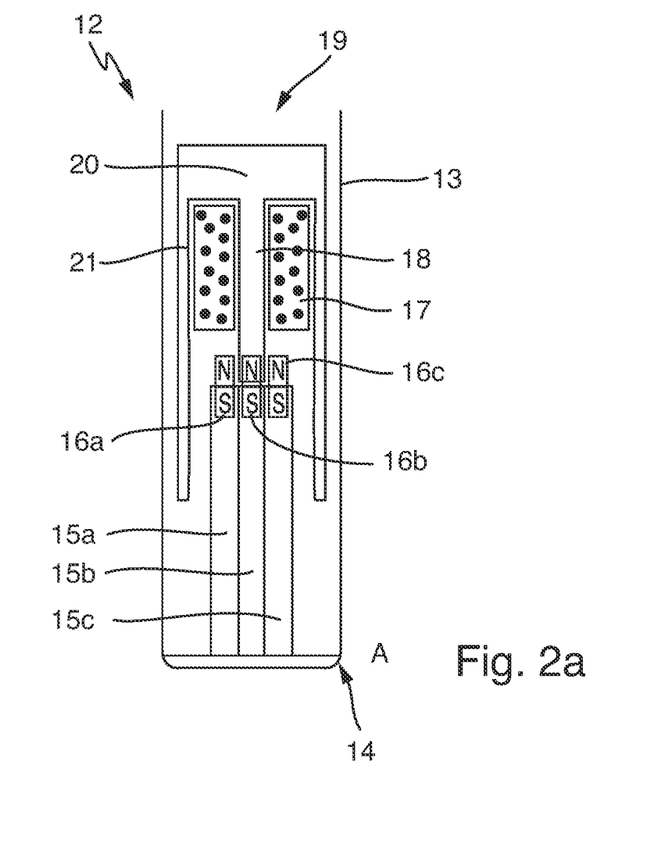
FIG. 2a shows a side view of an electromechanical transducer unit of the invention.

FIG. 2a is a schematic, side view of an electromechanical transducer unit 12 of the invention. The electromechanical transducer unit 12 replaces in this embodiment the driving/receiving unit 6 of the measuring device of FIG. 1a.

Provided in the lower wall of a housing 13 is a membrane 8,14. Thus, at the lower end, the housing 13 is closed with the membrane 14. In this example, the housing 13 is cylindrical and the membrane 8,14 is disc shaped with circularly round base area A. It is understood, however, that also other geometries are possible and fall within the scope of the present invention. Extending perpendicularly to the base area A of the membrane 8,14 and inwardly into the interior of the housing 13 are three rods 15a, 15b, 15c, which are secured to the membrane 8,14. The securement is especially a force transmitting connection. The base area A of the membrane 8,14 lies in a plane perpendicular to the longitudinal direction of the rods 15a, 15b, 15c. For example, the rods 15a, 15b, 15c are arranged at equal angles along an imaginary circular line around the midpoint M of the base area A of the membrane 8,14.

Figure 2B:
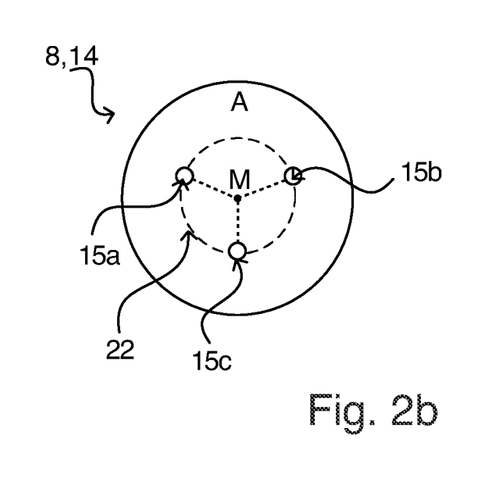
FIG. 2b shows an arrangement of three transducer rods in an embodiment of an electromechanical transducer unit of the invention.
Figure 2C:
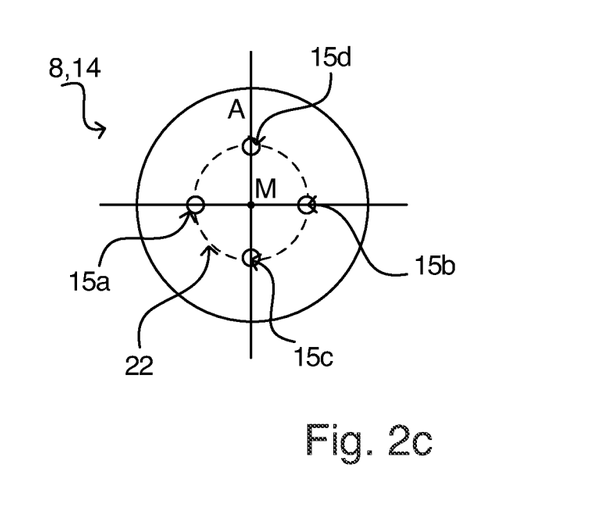
FIG. 2c shows an arrangement of four transducer rods in an embodiment of an electromechanical transducer unit of the invention.

Secured in the membrane 8,14 far end regions of the rods 15a, 15b, 15c are magnets 16a, 16b, 16c, especially SmCo or Alnico magnets. The magnets are preferably all equally oriented. In the case of an even number of rods, for example, in the case of 4 rods, as shown in FIG. 2c, in contrast, the magnets 16a-16d can also be pairwise equally oriented.

Arranged above the magnets 16a, 16b, 16c is a coil 17 with core 18. The rods 15a-15c with the magnets 16a-16c do not, in such case, contact the coil 17 and the core 18. The coil 17 in ongoing operation is supplied with an alternating current signal for producing a magnetic, alternating field. Due to this alternating field, the rods 15a-15c are deflected via the magnets 16a-16c horizontally, i.e. perpendicularly or transversely to their longitudinal axis, in such a manner that they are caused to oscillate. On the one hand, the rods 15a-15c exert then a lever effect, as a result of which bending of the rods 15a-15c produced by the horizontal deflection is transferred to the membrane 8,14 in such a manner that the membrane 8,14 is caused to oscillate. On the other hand, the combination of the three rods 15a-15c and the membrane 8,14 is a dedicated resonator. The exciting of the membrane 8,14 to execute mechanical oscillations occurs thus, by means of a magnetic, alternating field.

The core 18 of the coil 17 is, without limitation to generality, in this example of an embodiment part of a pot-shaped armature unit 19 with a floor 20 as well as a peripheral wall 21. For example, the floor 20 can have, same as the base area A of the membrane 8,14, a circular cross-sectional area. The core 18 of the coil 17 extends from the floor 20 of the pot-shaped armature unit 19 in the form of a nozzle centrally into the interior of the armature unit 19. The peripheral wall 21 has, in this case, the function of a magnetic field guide back. The armature unit 19 is preferably manufactured of a material of high magnetic permeability, especially iron, cobalt, or a metal glass.

According to the invention, at least one of the rods 15a-15c is essentially secured on the membrane 8,14 at a site on the base area of the membrane 8,14, where the second derivative of the deflection of the membrane 8,14 from a rest position as a function of the site on the base area is essentially zero. In the case of a circularly round membrane 8,14 with the base area A, which executes oscillations in the fundamental oscillation mode, this region is essentially defined by a circular line 22 extending around the midpoint M of the membrane 8,14, as shown in FIG. 2b. In the case of higher oscillation modes, lines of nodes form increasingly on the membrane 8,14, so that, as a function of oscillatory mode, also a number of regions can exist on the base area A of the membrane 8,14, where the second derivative of the deflection is essentially zero.

Preferred positionings of the rods 15a-15d on the base area of a membrane 8 with circularly round base area A for different numbers of rods 15a-15d are shown in FIGS. 2b and 2c. In the example of an embodiment shown in FIG. 2b, the electromechanical transducer unit 12 has three rods 15a, 15b, 15c, in each case, indicated by a circle and arranged in the region of the circular line 22 at equal angular spacing on the circumference (indicated by dotted lines in FIG. 2b). An embodiment with four rods 15a-15d arranged along the circular line 22 is shown in FIG. 2c, wherein, in each case, two rods 15a and 15b, and two rods 15c and 15d, lie opposite one another.

Figure 3:
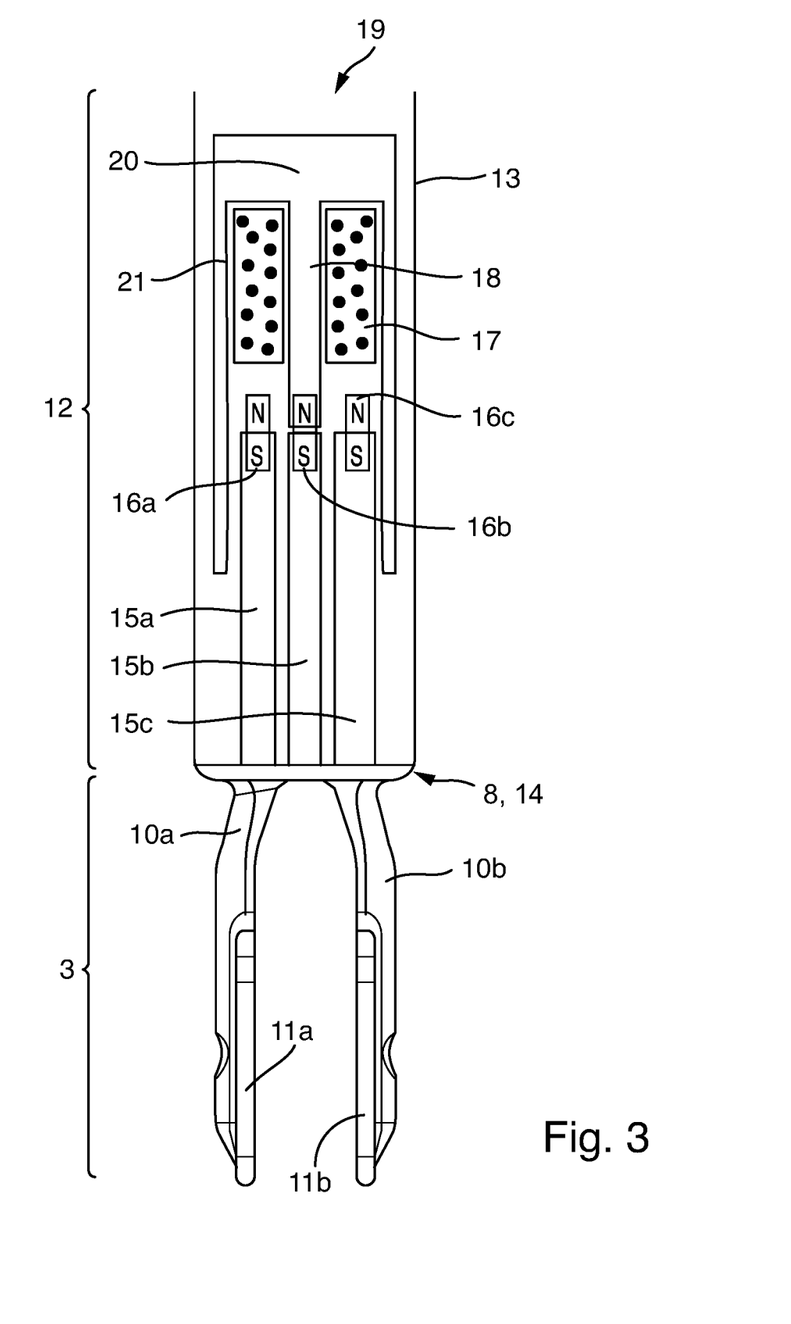
FIG. 3 shows a vibronic fill-level measuring device having an oscillatory fork as oscillatable unit and an electromechanical transducer unit of the invention with four rods.

FIG. 3 shows, finally, schematically, a vibronic fill-level measuring device having an oscillatable unit 3 as shown in FIG. 1b and an electromechanical transducer unit 12 as shown in FIG. 2, however, with four rods 15a-15d (rod 15d is hidden in the view). Already explained features of reference characters will not be repeated. The membrane 8,14 of the electromagnetic transducer unit in this example is simultaneously the membrane 8 of the oscillatory fork 3. There is, thus, a one piece membrane 8,14, which is associated with both the oscillatable unit 3 as well as also the electromechanical transducer unit 12. It is understood, however, that the membrane 8,14 in another embodiment can also be manufactured using two portions 8 and 14 connected force-transmittingly with one another, wherein the first portion 8 is associated with the electromechanical transducer unit 12, and the second portion 14 with the oscillatable unit 3.

Preferably, the two oscillatory tines 10a, 10b and two of the four rods 15a, 15b are secured to the membrane 8,14 in such a manner that, in each case, a rod 15a, 15b and an oscillatory tine 10a,10b extend along same longitudinal axes, which are axes perpendicular to the base area A through the membrane 8,14. In such case, the two longitudinal axes intersect the plane, which is parallel with membrane 8,14, at the same distance from the midpoint M of this area A. Because of this symmetric arrangement, an increased efficiency can be achieved.

In the case of such an arrangement, a coupled resonator system is involved. For the example with four rods 15a-15d, the two oscillatory tines 10a, 10b of the oscillatable unit 3 form with the membrane 8,14 a first mechanical resonator, while the pairs of rods 15a,15b, and 15c,15d, form with the membrane 8,14 second and third mechanical resonators, respectively. All three resonators are mechanically coupled with one another via the membrane 8,14, wherein the coupling is adjustable via the embodiment of the membrane 8,14. For example, the coupling can be influenced via the wall thickness, or the material, of the membrane 8,14, however, also by the type of connection with the tines 10a, 10b or rods 15a-15d. In such a resonator system, a number of oscillation modes occur with different resonance frequencies, a feature, which will be explained below based on FIGS. 4 and 5. It is to be noted here that, in contrast, in the case, in which no oscillatable unit 3 is associated with the electromechanical transducer unit 12, the four rods 15a-15d usually form a single resonator.

The presence of a mechanically oscillatable unit 3 in the form of an oscillatory fork on the oscillating membrane 8,14, such as shown in FIG. 2, leads, thus, to a changed oscillatory behavior of the apparatus 1. This is apparent, for example, from the curvature lines of the membrane 8,14 from its midpoint M to its edge along the two lines m and n shown in FIG. 4a, wherein the line m extends in parallel with an imaginary connecting line on the base area A of the membrane 8,14 through the two oscillatory tines 10a and 10b, and line n is perpendicular to line m. The two oscillatory tines 10a, 10b are indicated here by the two xs. The curvature lines along the lines n and m are, in contrast to the embodiment of FIG. 2, no longer symmetrical. This happens especially because the stiffnesses of the membrane 8,14 along the two lines m and n differ from one another. As a result, the locations on the base area A of the membrane 8,14, where the second derivative of the deflection of the membrane 8,14 from its rest position is essentially equal to zero, are no longer given by a circular line 22, but, instead, by an ellipse 23.

For an as efficient as possible energy transfer from the rods 15a-15d to the membrane 8,14, it is correspondingly advantageous to arrange the rods 15a-15d along the ellipse 23 extending around the midpoint M of the base area A of the membrane 8,14. Then all rods 15a-15d would be arranged in the region of maximum curvature of the membrane 8,14, thus, where the rods 15a-15d each experience in the region secured to the membrane 8,14 a maximum deflection. Furthermore, it is advantageous that the separation of each of the rods 15a-15d from a coil with core arranged preferably above the midpoint M of the base area A of the membrane 8,14 be essentially equal, in order that the rods 15a-15d are displaced uniformly for oscillation. If one desires the best compromise between these two requirements, for example, the preferred arrangements shown in FIGS. 4b and 4c for the case of electromechanical transducer units 12 with three and four rods 15a-15d can be recommended.

Figure 4A:
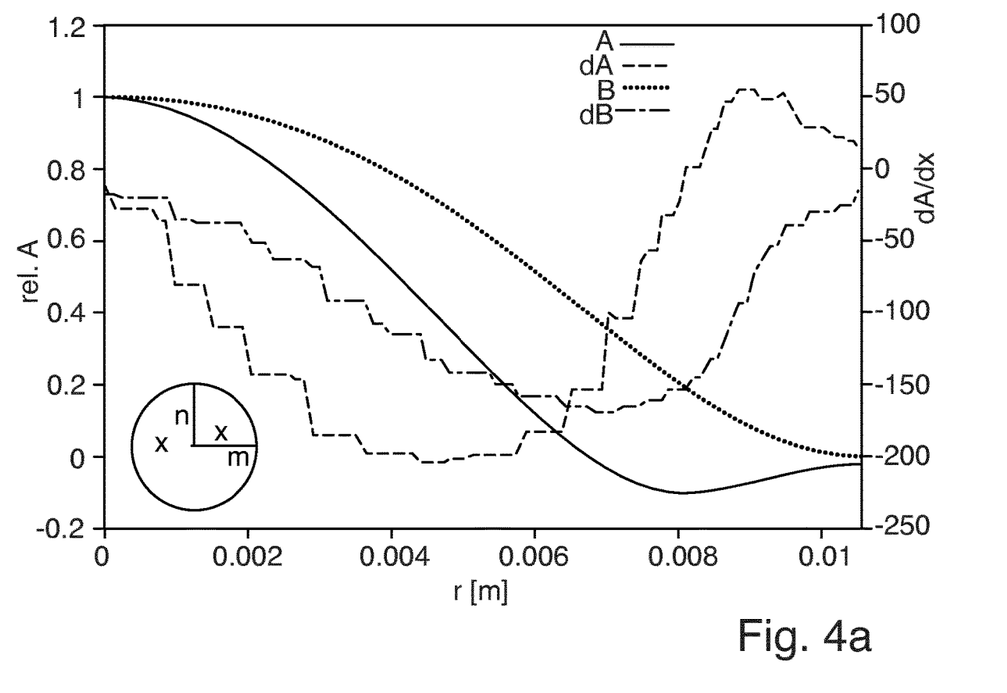
FIG. 4a shows curvature lines of the membrane in the case of the vibronic fill-level measuring device of FIG. 3.
Figure 4B:
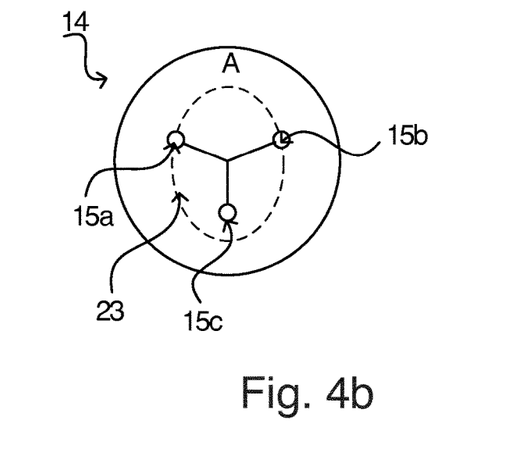
FIG. 4b shows an arrangement three transducer rods on a base area of a membrane of an embodiment of the vibronic fill-level measuring device of FIG. 3.

In the case of three rods 15a-15c, these are arranged in the corner points of an equal angled triangle extending around the midpoint M of the membrane 8,14, as shown in FIG. 4b. The connecting line between two 15a,15b of the three rods 15a-15c extends in parallel with a connecting line between the two tines 10a,10b. For the embodiment of FIG. 4b, the two rods 15a, 15b are, furthermore, arranged at a site on the base area A of the membrane 8,14, which during the oscillatory movement experiences the greatest curvature, where the second derivative of the deflection of the membrane 8,14 from the rest position is, thus, essentially zero. Alternatively, it is likewise an option that only one of the three rods 15a-15c is arranged at a site on the base area A of the membrane 8,14, where the second derivative of the deflection of the membrane 8,14 is essentially zero. Then, preferably the connecting line between the two other of the three rods 15a-15c extends in parallel with a connecting line between the two tines 10a, 10b.

Figure 4C:
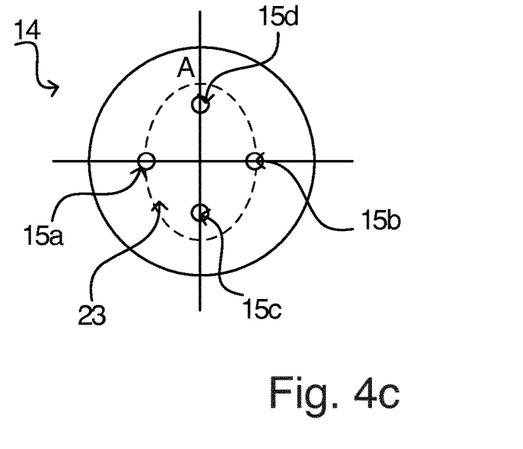
FIG. 4c shows an arrangement three transducer rods on a base area of a membrane of an embodiment of the vibronic fill-level measuring device of FIG. 3.

As evident from FIG. 4c, in the case of four rods 15a-15d, the rods 15a-15d are, in contrast, similarly to the case of a membrane 8,14 as shown in FIG. 2, preferably arranged along a circular line around the midpoint M of the base area A of the membrane 8,14, so that, in each case, two of the four rods 15a-15d lie opposite one another across the midpoint M of the base area A of the membrane 8,14. This has the result that, in contrast to the embodiment of FIG. 2, in this example, only two of the four rods 15a-15d are arranged at a site on the base area A of the membrane 8,14, where the second derivative of the deflection is essentially zero, since these locations are described by the ellipse 23.

Thus, involved in the case of an apparatus 1 with an oscillatable unit 3 and an electromechanical transducer unit 12 of the invention is a coupled resonator system having a number of resonance frequencies, similarly to the system described in the yet unpublished German patent application No. 102015104533.8. For the sake of convenience, such a coupled resonator system is explained below based on FIG. 5 for the case of an electromechanical transducer unit 12 with four rods 15a-15d, as shown in FIG. 4c. For the case of an uneven number of rods, especially in the case of three rods 15a-15c, similar considerations hold. It is noted, however, that in comparison with an arrangement with an even number of rods 15a-15d, especially due to the respective symmetries of the arrangements, relatively more complex oscillation modes can occur.

Figure 5:
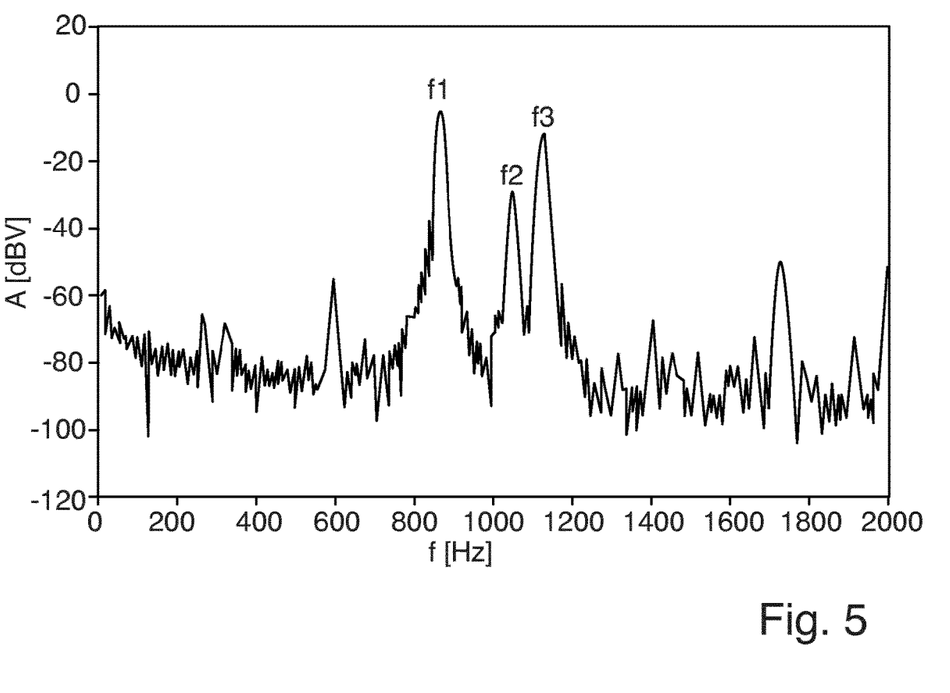
FIG. 5 shows a frequency spectrum of a vibronic sensor having an oscillatable unit in the form of an oscillatory fork and an electromechanical transducer unit with four rods.

In a coupled resonator system having four rods 15a-15d and an oscillatable unit 3 in the form of an oscillatory fork, three resonance frequencies occur, of which one belongs to an antisymmetric oscillation mode and two to symmetric oscillation modes, such as evident from the frequency spectrum in FIG. 5, where the medium was air. The antisymmetric, oscillatory mode f1 lies in the case of this example of a frequency spectrum at about 864 Hz, while the two symmetric oscillation modes f2 and f3 lie at 1050 Hz and at 1135 Hz. In the case of the antisymmetric, oscillatory mode with the frequency f1, the rods 15a-15d move in the membrane 8,14 far region toward one another, when the two oscillatory tines 10a, 10b in the region of the paddles 11a, 11b move away from one another. This oscillatory mode corresponds to the natural oscillatory movement of the oscillatory fork 3, for example, an oscillatory fork 3 applied in an LIQUIPHANT instrument. The symmetric oscillation modes, in contrast, move the two oscillatory tines 10a, 10b in the region of the paddle 11a, 11 b likewise toward one another, when the rods 15a-15d in the membrane 8,14 far region move toward one another. For the symmetric oscillation modes with the resonance frequencies f2 and f3, in each case, the oscillation amplitude of one of the two rod pairs 15a and 15b, and 15c and 15d, is slightly greater than that of the other rod pair. In case of resonance frequencies of the individual oscillation modes f1-f3 lying near enough relative to one another, this is, however, insignificant and the rods 15a-15d and the oscillatory tines 10a, 10b oscillate essentially with equal amplitude.

The invention claimed is:

1. An electromechanical transducer unit for a field device of automation technology, comprising:
  a membrane having a base area and displaceable to execute mechanical oscillations;
  at least three rods secured to the membrane perpendicular to the base area;
  a housing, wherein the membrane forms at least a portion of a wall of the housing, and wherein the at least three rods extend into the housing;
  at least three magnets, each of the at least three magnets secured to one of the at least three rods at an end of each respective rod opposite the membrane; and
  a coil with a core disposed within the housing adjacent the at least three magnets, wherein the coil is configured to be supplied with an electrical alternating current signal,
  wherein the coil is embodied to generate a magnetic field that causes the at least three rods, via the at least three magnets, to execute mechanical oscillations, wherein the at least three rods are secured to the membrane such that oscillations of the membrane result from the oscillations of the at least three rods,
  wherein at least one of the at least three rods is secured to the membrane at a site on the base area of the membrane at which site a second derivative of a deflection of the membrane from a rest position as a function of the site on the base area of the membrane is essentially zero.

2. The electromechanical transducer unit of claim 1, wherein the at least three rods includes an even number of rods, and wherein the even number of rods are arranged symmetrically around a midpoint of the membrane.

3. The electromechanical transducer unit of claim 1, wherein the at least three rods includes an odd number of rods, wherein the odd number of rods are arranged at equal angles around a midpoint of the membrane.

4. The electromechanical transducer unit of claim 1, wherein the coil with core is arranged substantially above a midpoint of the base area of the membrane.

5. The electromechanical transducer unit of claim 4, wherein each of the at least three magnets has substantially a same separation from the coil with core.

6. The electromechanical transducer unit of claim 5, wherein the separation between each of the at least three magnets and the coil with core is less than 2 millimeters.

7. An apparatus for determining and/or monitoring at least one process variable of a medium in a containment, the apparatus comprising:
  a sensor unit including an electromechanical transducer unit, the electromechanical transducer unit including:
    a membrane having a base area and displaceable to execute mechanical oscillations;
    at least three rods secured to the membrane perpendicular to the base area;
    a housing, wherein the membrane forms at least a portion of a wall of the housing, and wherein the at least three rods extend into the housing;
    at least three magnets, each of the at least three magnets secured to one of the at least three rods at an end of each respective rod opposite the membrane; and
    a coil with a core disposed within the housing adjacent the at least three magnets, wherein the coil is configured to be supplied with an electrical alternating current signal,
    wherein the coil is embodied to generate a magnetic field that causes the at least three rods, via the at least three magnets, to execute mechanical oscillations, wherein the at least three rods are secured to the membrane such that oscillations of the membrane result from the oscillations of the at least three rods,
    wherein at least one of the at least three rods is secured to the membrane at a site on the base area of the membrane, at which site a second derivative of a deflection of the membrane from a rest position as a function of the site on the base area is essentially zero; and
  an electronics unit,
  wherein the electromechanical transducer unit is configured to excite the sensor unit using an electrical exciting signal, in the form of an electrical alternating current signal with which the coil is supplied, to execute the mechanical oscillations, to receive the mechanical oscillations of the sensor unit, and to convert such into an electrical received signal in the form of an electrical alternating current signal, and
  wherein the electronics unit is configured to generate the exciter signal starting from the received signal and to determine the at least one process variable at least based on the received signal.

8. The apparatus of claim 7, wherein the sensor unit further includes an oscillatable system connected to the electromechanical transducer unit.

9. The apparatus of claim 8, wherein the oscillatable system includes at least one oscillatory tine, which is connected to the membrane of the electromechanical transducer unit.

10. The apparatus of claim 8, wherein the oscillatable system includes two oscillatory tines, wherein the at least three rods of the electromechanical transducer unit includes four rods secured to the membrane, and wherein two of the four rods and the two oscillatory tines are arranged opposite one another in mirror symmetry with respect to a plane perpendicular to a longitudinal axis through the rods and/or the oscillatory tines.

11. The apparatus of claim 8, wherein the oscillatable system includes two oscillatory tines, wherein the at least three rods of the electromechanical transducer unit includes only three rods secured to the membrane, and wherein the three rods are arranged at corner points of an equilateral triangle arranged around a midpoint of the base area of the membrane such that a connecting line between two of the three rods extends in parallel with a connecting line between the two tines.

12. The apparatus of claim 7, wherein the at least one process variable is a fill level, a flow velocity, a density or a viscosity of the medium.

13. The apparatus of claim 7, wherein the membrane comprises a first portion and a second portion, wherein the first portion and the second portion are connected such that force is transmitted therebetween, and wherein the first portion is connected to the oscillatable system, and the second portion is connected to the at least three rods of the electromechanical transducer unit.

* * * * *